United States Patent [19]

Renfrew et al.

[11] 4,141,892
[45] Feb. 27, 1979

[54] PROCESS FOR PREPARING p-[[p-(PHENYLAZO)PHENYL]AZO]-PHENOL

[75] Inventors: Edgar E. Renfrew, Flemington; Roy E. Smith, Mill Hall, both of Pa.

[73] Assignee: American Color & Chemical Corporation, Charlotte, N.C.

[21] Appl. No.: 821,950

[22] Filed: Aug. 4, 1977

[51] Int. Cl.² ........................................... C09B 31/06
[52] U.S. Cl. .................................. 260/186; 260/208
[58] Field of Search ....................................... 260/186

[56] References Cited
U.S. PATENT DOCUMENTS

| | | | |
|---|---|---|---|
| 2,072,252 | 3/1937 | Ellis | 260/186 |
| 2,782,185 | 2/1957 | Merian | 260/186 |

*Primary Examiner*—Floyd D. Higel
*Attorney, Agent, or Firm*—Armstrong, Nikaido, Marmelstein & Kubovcik

[57] ABSTRACT

A process for preparing the compound, or dye,

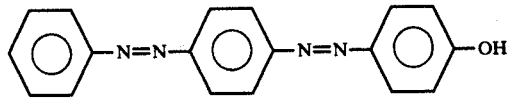

by forming aminoazobenzene employing a slight excess of sodium nitrite in the diazotization of aniline and, without isolation, diazotizing the monoazo base and coupling the diazonium salt into phenol.

1 Claim, No Drawings

PROCESS FOR PREPARING P-[[P-(PHENYLAZO)PHENYL]AZO]PHENOL

BACKGROUND OF THE INVENTION

1. Field of the Invention

The present invention relates to a process for preparing p-[[p-(phenylazo)phenyl]azo]phenol (C.I. Disperse Yellow 23).

2. Description of the Prior Art

Disperse Yellow 23 has been made historically by diazotizing aminoazobenzene and coupling the resultant diazonium salt into phenol to yield

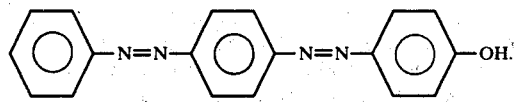

This method requires the making, isolation and handling of aminoazobenzene which has recently been declared to be a dangerous material because of potential carcenogenicity.

Aminoazobenzene has typically been manufactured using somewhat less than one-half mole of benzenediazonium chloride per one-half mole aniline which ensures against the presence of decomposition products of benzenediazonium chloride in the diazotization mixture which could produce unwanted impurities. In production, such impurities are minimized by the above condition, and if formed, are washed out along with excess aniline with water or aqueous hydrochloric acid during isolation of the aminoazobenzene.

It is an object of the present invention, therefore, to provide a process for preparing Disperse Yellow 23 which does not require the prior isolation of aminoazobenzene and which avoids or minimizes the formation of undesired decomposition products of benzenediazonium chloride.

SUMMARY OF THE INVENTION

According to the present invention there is provided a process for preparing p-[[p-(phenylazo)phenyl]azo]phenol by first preparing aminoazobenzene by treating aniline with a slight excess of benzenediazonium chloride, i.e., by employing a slight excess of the diazotizing agent, sodium nitrite, required to diazotize one-half of the amount of aniline; allowing excess benzenediazonium chloride to decompose to yield, as the principal decomposition product, phenol; and thereafter rediazotizing the unisolated monoazo base and coupling it into phenol.

Heretofore, there has been no realization in the prior art that the "impurity" produced by the decomposition of benzenediazonium chloride is a useful coupler in the production of Disperse Yellow 23 from aminoazobenzene.

DESCRIPTION OF THE PREFERRED EMBODIMENTS

In the first stage of the process according to the present invention, aminoazobenzene is prepared in a usual way by the diazotization of aniline and rearrangement of diazoaminobenzene intermediate in an aqueous solution of hydrochloric acid employing sodium nitrite as the diazotizing agent. Contrary to conventional methods, however, the sodium nitrite is used in a slight excess of the amount theoretically required to diazotize exactly one-half of the amount of aniline. The amount of sodium nitrite used in excess is that the amount which ensures that no aniline remains in the solution following the formation of the aminoazobenzene. In practice, amounts of sodium nitrite of about 10% in excess of the amount stoichiometrically required to diazotize one-half of the aniline, on a molar basis, has been found sufficient to avoid any residual aniline which could give undesirable monoazo products during the final diazotization and coupling reactions in which the desired disazo structure is formed.

Amounts of sodium nitrite of greater than 10% excess are not desired because this excess amount of sodium nitrite can also lead to the formation of undesirable monoazo products and difficulties in processing.

Following the diazotization of the aniline to form benzenediazonium chloride, coupling of the benzenediazonium chloride into the remaining aniline and rearrangement of diazoaminobenzene intermediate to form aminoazobenzene, any excess benzenediazonium chloride remaining in the mixture is allowed to carefully decompose to prevent it from coupling into the aminoazobenzene. Decomposition of the benzenediazonium chloride yields mostly phenol and trace amounts of chlorobenzene. The phenol becomes a useful coupler in the second stage of the reaction to yield the p-[[p-(phenylazl)phenyl]azo]phenol. The chlorobenzene, on the other hand, does not couple into aminoazobenzene and thus does not form undesirable disazo products. The excess benzenediazonium chloride is decomposed by warming the aminoazobenzene mixture, which, following rearrangement in a usual manner is at a temperature of about 30° C., to about 40° C. until negative tests for the presence of benzenediazonium chloride are obtained with "R" salt solutions and thereafter heating to about 75° C. to ensure the complete decomposition of benzenediazonium chloride and to form a salt of the aminoazobenzene so as to obtain maximum diazotization in the subsequent step. Decomposition at these temperatures is accelerated within commercially acceptable periods of time.

The aminoazobenzene, without isolation, is then rediazotized in a second stage in a usual manner with sodium nitrite and coupled into phenol by, for example, running the rediazotized monoazo base into a alkaline solution of phenol.

The invention may be better understood by referring to the following example.

EXAMPLE

Disperse Yellow 23 was prepared by a method in which aniline (46.5 g, 0.5 mole) was added to 32% hydrochloric acid (70 g = 22.4 g 100%, 0.615 mole) and stirred to a smooth slurry. To this slurry was then added water (150 g) and ice (150 g). The temperature of this resultant thin slurry was −2° C. To this was added sodium nitrite (18.7 g, 0.27 mole). Stirring was continued at −2° C. to 0° C. for two hours, then stirred to room temperature over several hours. The mixture was then warmed to 40° C. and stirred three hours. There was a weakly positive R-Salt test. Hydrochloric acid (130 g of 32%) was added and the mixture heated to 75° C. It was then drowned into ice (150 g) and cooled further to 13° C. by adding ice as needed.

The second diazotization was effected by adding a solution of sodium nitrite (20.6 g, 0.299 mole) in water (50 g). The diazonium salt solution was clarified after stirring at 13° C.-15° C. for two hours. The clarified solution was added to a solution of phenol (20 g, 0.213 mole) in water (290 g) containing sodium carbonate (64 g). The coupling solution temperature was maintained at 10°-15° C. by adding ice as needed. After coupling was complete, the color was isolated by filtration and washed free of alkali with water. The yield of disazo dye base was 49.0 g, or 76% of the theoretical amount.

The scope and spirit of the present invention is defined in the appended claim.

What is claimed is:

1. In a method for preparing the compound:

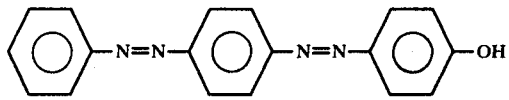

wherein aniline is diazotized in aqueous hydrochloric acid employing sodium nitrite as the diazotizing agent to form benzenediazonium chloride, the benzenediazonium chloride is coupled into aniline to form aminoazobenzene, and the aminoazobenzene is diazotized and coupled into phenol; the improvement comprising: diazotizing the aniline employing an excess of sodium nitrite of up to about 10% of the amount stoichiometrically required to diazotize one-half of the aniline on a molar basis; coupling the resultant benzenediazonium chloride with the remaining aniline to form a mixture of aminoazobenzene and excess benzenediazonium chloride in aqueous hydrochloric acid; heating said mixture to about 40° C. and allowing said excess benzenediazonium chloride to decompose and, subsequently, without isolation, diazotizing said aminoazobenzene and coupling it into phenol.

* * * * *